United States Patent
Kapur

(10) Patent No.: US 9,652,353 B2
(45) Date of Patent: May 16, 2017

(54) MONITORING BUSINESS TRANSACTION FAILURES INVOLVING DATABASE PROCEDURE CALLS

(71) Applicant: ORACLE INTERNATIONAL CORPORATION, Redwood Shores, CA (US)

(72) Inventor: Kunal Kapur, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 14/548,980

(22) Filed: Nov. 20, 2014

(65) Prior Publication Data

US 2015/0106348 A1 Apr. 16, 2015

Related U.S. Application Data

(63) Continuation-in-part of application No. 14/053,922, filed on Oct. 15, 2013.

(51) Int. Cl.
  *G06F 11/34* (2006.01)
  *G06F 11/36* (2006.01)
  *G06F 11/30* (2006.01)

(52) U.S. Cl.
  CPC ...... *G06F 11/3404* (2013.01); *G06F 11/3089* (2013.01); *G06F 11/3466* (2013.01); *G06F 11/36* (2013.01); *G06F 11/3476* (2013.01); *G06F 2201/80* (2013.01); *G06F 2201/865* (2013.01); *G06F 2201/87* (2013.01)

(58) Field of Classification Search
  CPC ............. G06F 11/3466; G06F 11/3612; G06F 11/3672; G06F 11/3676; G06F 11/3688; G06F 2201/865; G06F 11/3644; G06F 17/3051; G06F 2201/86; G06F 11/3404
  See application file for complete search history.

(56) References Cited

U.S. PATENT DOCUMENTS 5,559,313 A 9/1996 Claus
6,158,049 A 12/2000 Goodwin et al.
(Continued)

OTHER PUBLICATIONS

Oracle Business Transaction Management; "Business Transaction Management", An Oracle White Paper, May 2010; pp. 1-13; Oracle Corporation; Redwood Shores, CA, USA.
(Continued)

*Primary Examiner* — Loan L. T. Truong
(74) *Attorney, Agent, or Firm* — Cooper Legal Group, LLC

(57) ABSTRACT

Systems, methods, and other embodiments associated with modifying applications and monitoring exceptions are described. In one embodiment, a computer implemented method searches an executable code for code representing a database procedure call within the executable code. At a location in the executable code prior to the database procedure call, exception capturing code is inserted into the executable code that is configured to cause information to be collected about an exception when the exception occurs during execution of the database procedure call. After the database procedure call, termination code is inserted in the executable code, wherein the termination code is configured to terminate the collection of the information caused by the exception capturing code.

20 Claims, 7 Drawing Sheets

(56) References Cited

U.S. PATENT DOCUMENTS

| | | |
|---|---|---|
| 6,317,868 B1 | 11/2001 | Grimm et al. |
| 6,385,766 B1 | 5/2002 | Doran et al. |
| 6,397,382 B1 | 5/2002 | Dawson |
| 6,754,888 B1 | 6/2004 | Dryfoos et al. |
| 6,865,736 B2 | 3/2005 | Holmberg et al. |
| 6,918,053 B1 | 7/2005 | Thatte |
| 7,379,999 B1* | 5/2008 | Zhou ................ G06F 11/3476 709/224 |
| 7,519,944 B2 | 4/2009 | Havin |
| 7,689,447 B1* | 3/2010 | Aboujaoude ......... G06Q 10/06 705/7.15 |
| 7,743,150 B1 | 6/2010 | Carter et al. |
| 7,784,044 B2 | 8/2010 | Buban et al. |
| 7,814,477 B2 | 10/2010 | Sun et al. |
| 8,141,052 B2* | 3/2012 | Guarraci ............... G06F 11/366 717/127 |
| 8,225,317 B1 | 7/2012 | Chiueh |
| 8,799,882 B2* | 8/2014 | Tarditi, Jr. ............. G06F 9/466 717/151 |
| 9,372,693 B2* | 6/2016 | Bradbury ............. G06F 9/3005 |
| 2001/0047510 A1* | 11/2001 | Angel ................ G06F 11/3612 717/128 |
| 2002/0065885 A1 | 5/2002 | Buonanno |
| 2002/0095661 A1* | 7/2002 | Angel ................ G06F 11/3612 717/130 |
| 2002/0199179 A1 | 12/2002 | Lavery et al. |
| 2003/0046676 A1 | 3/2003 | Cheng et al. |
| 2003/0056201 A1 | 3/2003 | Degenaro et al. |
| 2003/0110165 A1* | 6/2003 | Selgas ............... G06F 17/30011 |
| 2004/0015435 A1 | 1/2004 | Solomon |
| 2004/0093595 A1 | 5/2004 | Bilange |
| 2004/0107416 A1* | 6/2004 | Buban ....................... G06F 8/68 717/170 |
| 2004/0181750 A1* | 9/2004 | Lection ............. G06F 17/30914 715/234 |
| 2004/0237067 A1 | 11/2004 | Sun et al. |
| 2004/0250240 A1* | 12/2004 | Stoodley ............. G06F 9/45516 717/116 |
| 2005/0138111 A1* | 6/2005 | Aton ................... G06F 11/3476 709/201 |
| 2006/0031200 A1* | 2/2006 | Santosuosso ..... G06F 17/30306 |
| 2006/0143231 A1 | 6/2006 | Boccasam |
| 2006/0161891 A1 | 7/2006 | Ehnebuske et al. |
| 2007/0150900 A1* | 6/2007 | Hankins ................. G06F 9/462 718/108 |
| 2008/0034014 A1* | 2/2008 | Beck ................ G06F 17/30575 |
| 2008/0282229 A1* | 11/2008 | Kim ....................... G06F 9/4448 717/124 |
| 2008/0307036 A1* | 12/2008 | Mishra ..................... H04L 67/16 709/203 |
| 2009/0007081 A1* | 1/2009 | Lau ........................... G06F 8/51 717/136 |
| 2009/0271231 A1 | 10/2009 | Buddenbaum |
| 2010/0293209 A1* | 11/2010 | Bireley ............. G06F 17/30418 707/718 |
| 2011/0107307 A1 | 5/2011 | Liu |
| 2012/0131392 A1 | 5/2012 | Bendig |
| 2012/0144366 A1* | 6/2012 | Lebert ....................... G06F 8/72 717/110 |
| 2012/0158788 A1* | 6/2012 | Kemmler .......... G06F 17/30607 707/792 |
| 2013/0066955 A1* | 3/2013 | Neel ..................... H04L 67/146 709/203 |
| 2013/0104107 A1* | 4/2013 | De Smet ............. G06F 11/3664 717/125 |
| 2013/0339975 A1 | 12/2013 | Busaba |
| 2014/0109111 A1 | 4/2014 | Gupta et al. |
| 2014/0237453 A1* | 8/2014 | Hulick, Jr. .......... G06F 11/3612 717/127 |
| 2014/0298299 A1* | 10/2014 | Rathina Balan .... G06F 11/3668 717/127 |
| 2015/0046389 A1 | 2/2015 | Dhayapule |
| 2015/0106659 A1* | 4/2015 | Kapur ................. G06F 11/3612 714/39 |

OTHER PUBLICATIONS

Oracle Corporation; "Managing Exceptions in Distributed Applications", An Oracle White Paper, Mar. 2010; pp. 1-13; Oracle Corporation; Redwood Shores, CA, USA.

Oracle Corporation; "Oracle Database—PL/SQL User's Guide and Reference", 10g Release 2 (10.2) B14261-01; Jun. 2005; pp. 1-35; Oracle Corporation; Redwood Shores, CA, USA.

US Patent and Trademark Non-Final Office Action in co-pending U.S. Appl. No. 14/053,922, filed Oct. 15, 2013; notification date Jan. 14, 2016.

US Patent and Trademark Final Office Action in co-pending U.S. Appl. No. 14/053,922, filed Oct. 15, 2013; notification date Aug. 4, 2016.

* cited by examiner

MONITORING BUSINESS TRANSACTION FAILURES INVOLVING DATABASE PROCEDURE CALLS

CROSS REFERENCE TO RELATED APPLICATIONS

This disclosure claims the benefit of and is a continuation-in-part of U.S. patent application Ser. No. 14/053,922 filed Oct. 15, 2013, titled "Monitoring and Diagnostics of Business Transactions Failures", inventors: Kapur et al., and assigned to the present assignee.

BACKGROUND

Complex computerized distributed systems and applications include software running on multiple servers and may include integrated products or software libraries from multiple vendors. Components of the system are located on networked computers that interact and coordinate their actions to work properly. The system may also interact with third party systems to complete certain transactions.

For example, consider an online shopping application where a customer selects items to purchase and initiates a "submit order" action to buy the items. To the customer, the process appears simple but behind the scenes, the process can be very complex. Many function calls may be made by a computer to third party systems and/or calls to different types of systems with multiple technologies. There may be a function call to a credit card system to verify the customer's credit card and available funds, a call to an inventory database to verify that the purchased items are in stock, a call to a shipping system to get shipping information for delivering the purchased items, and other calls needed to process the order. All of the actions performed to complete the "submit order" are referred to as a business transaction. The individual systems and the online shopping application need to work together to properly process the business transaction.

Sometimes an error occurs somewhere during the business transaction causing the transaction to fail. The distributed structure of the system makes it difficult to locate and identify the root cause of the error. In computing, certain kinds of errors or other failures generate "exceptions." Exceptions are conditions or events that disrupt the normal flow of executing instructions in a software application and are a common part of many computing environments. Often, the root cause of an environment, a configuration or security issue, or a bug or unsupported use in a piece of program code manifests itself in the form of an exception. When an exception occurs during runtime, it can cause unpredictable effects, such as a failed business transaction, or cause a transaction to take longer/shorter than usual to complete.

Exceptions in distributed applications can also take the form of system or application errors (for example, invalid data in requests, transport-level errors, network failure, inaccurate responses) or business errors (for example, excessive weight of shipment, bad credit for a premier customer). Unfortunately, it is usually the customer (the consumer/user of a distributed application) who experiences exceptions before anyone within the enterprise. Common examples include generic messages on an e-commerce website (e.g., "Sorry, unable to process request at this time"), delayed orders, and/or lost packages.

Each occurrence of an exception can disrupt the customer's experience up front and may have a direct impact on the business. Therefore, managing exceptions proactively is important to any business.

Typically, programmers attempt to handle foreseeable exceptions by writing program code in the application that performs certain actions when the exception occurs during runtime. Such code is called an exception handler. However, the manner in which the exception is handled is dependent to how well the programmer writes the exception handling code. Sometimes an exception does not get logged by the respective code at all (e.g., data relating to the exception is not collected or stored). Poorly handled exceptions become very difficult to identify when the exceptions occur during runtime, which makes it difficult to locate and identify the root cause of the exception. Even with well-handled exceptions, a challenge is that data collected from the exception often end up scattered in multiple log files with hard to correlate formats that are spread out on different machines. This makes it difficult for a system administrator to know that an exception happened. Even when the administrator has knowledge that an exception happened, the administrator may not know where the exception was logged. Moreover, it's even more difficult to identify the business transaction that the exception happened as part of, and difficult to determine the exception's criticality and impact to the business. Typically, complex and time consuming debugging procedures are manually performed to identify the above exceptions. In some circumstances, the error conditions that caused the exception cannot be recreated, making it very difficult to identify and correct the error.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that provide a mechanism to capture and report exceptions/throwables that occur during business transactions of an executing application. Catching and reporting exceptions allows application developers and administrators to more easily identify the root cause of a failed transaction. In one embodiment, the present system and method provides the capability to capture exceptions that occur within a business transaction, which provides end-to-end monitoring and diagnostics of business transaction failures.

Even in applications that have exception handling code, which is programmed to log messages about a problem, it is very difficult for a reader of the logs to manually associate the exception/problem in the log with the transaction that the failure was part of (since the transaction is at a higher level and could span multiple servers). It is also very difficult to go the other way around, e.g., associate the transaction to the exceptions that happened in the context of the transaction. In one embodiment, the present system and method determines and generates information that shows the relationship between a business transaction and an exception that occurred as part of the transaction by associating or linking them to each other.

It will be appreciated that the present system and method is applicable to distributed transactions and production monitoring with low performance overhead.

Figure 1:
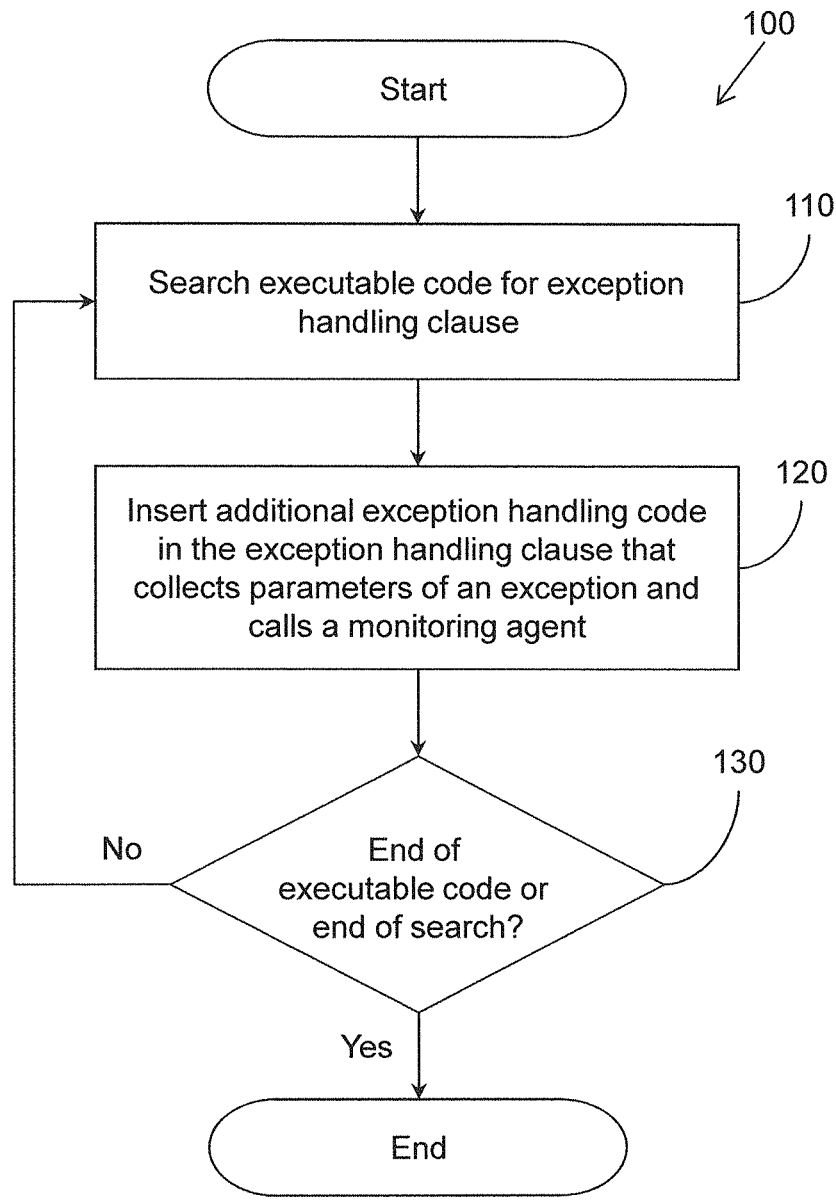
FIG. 1 illustrates one embodiment of a method associated with reconfiguring an application to customize exception handling code.

With reference to FIG. 1, one embodiment of a computer implemented method 100 is shown that programmatically modifies an application to have more reliable exception handling techniques. For example, the method reconfigures the software application by modifying exception handling code within the application and adds code for capturing and reporting exceptions in a consistent and reliable manner. In one embodiment, a computing device is implemented with an executable algorithm that is configured to perform the method 100 or any other disclosed method herein.

Method 100 initiates and a target application is selected for modification. In one embodiment, the target application is in an executable form (e.g., bytecode, binary files, machine code, etc.) and maybe one file or a collection of files/modules. At 110, the executable code is searched and analyzed for an exception handling clause within the executable code. Depending on the type of code or programming language of the source code, there is typically a defined syntax, a label, or instruction that is assigned to an exception handling clause in the code. The computer implemented method 100 is configured to search for and identify the designated code that represents an exception handling clause. Particular examples will be discussed with reference to FIG. 2.

With continued reference to FIG. 1, at 120, when the exception handling clause is found, additional exception handling code is inserted/embedded into the exception handling clause in the executable code. For example, bytecode instrumentation is a technique to inject code into bytecode of an application. In one embodiment, the added code is configured (i) to collect information about an exception when the exception occurs during execution of the executable code, and (ii) to transmit the information about the exception to a monitoring agent. For example, executable code that calls the monitoring agent is inserted that passes information about the exception, which may include parameters or other data from the exception, to the monitoring agent. At 130, after the code is inserted, the method checks whether there is more executable code to search or whether the search is otherwise to terminate (e.g., by a user, etc).

If the method continues, it returns to 110 where the method repeats the process to find other exception handling clauses in the executable code and at least inserts code that calls the monitoring agent into each found clause. The method can be configured to modify selected types of exception handling clauses or modify all the clauses. In one embodiment, the method searches the executable code that is active and loaded in memory for execution. In Java, a class would be searched while the class is being loaded in memory, which happens when the class is first accessed by the application. Thus not all executable code from an application needs to be searched; just the code that gets loaded into memory to be used. Also, modifying the code in memory does not permanently change the application since the original code is maintained on disk and is not modified. In another embodiment, the method searches the executable code that is stored on disk and modifies the code on the disk.

Overall, the executable application is reconfigured so that exception handling clauses are made to perform the same or similar action in response to an exception (e.g., call the monitoring agent with data) in addition to performing its original exception handling code. In this way, exception handling is performed in a consistent manner so that the data from every exception is collected/stored/reported in a uniform way at a known location (e.g., the monitoring agent). Collecting exception data in a known manner provides visibility into what happened during runtime and helps to identify the root cause of a failed business transaction.

Among other things, modifying the exception handling clauses as described herein rectifies situations where an exception handling clause is not properly written such that the original code fails to handle the exception in a useful way. For example, the original clause might be written such that the clause (a) might be empty (has no code), (b) does not properly log data, (c) logs the data in an unknown or inaccessible location (e.g., in proprietary storage device/file) that makes the collected data useless, (d) suppresses the root cause exception (e.g. a new exception is thrown inside a catch block, thus suppressing the original exception), or (e) has other defects in the program code. In another embodiment, the method is configured to associate a caught exception with the business transaction during which the exception occurred. This is described in more detail with reference to FIG. 3.

In other embodiments, the method 100 can search for and identify all relevant exception handling clauses within the executable code. The additional exception handling code may be inserted into every identified clause or into a number of selected exception handling clauses. The inserted exception handling code may be the same code for every clause or may be different code inserted for different exception handling clauses. For example, based on the type of exception being handled, different code is selected from a library of code and inserted based on the type so that the type of exception is handled appropriately. With the above techniques, the present system/method can automatically capture exceptions for business transactions that span multiple containers.

Figure 2:
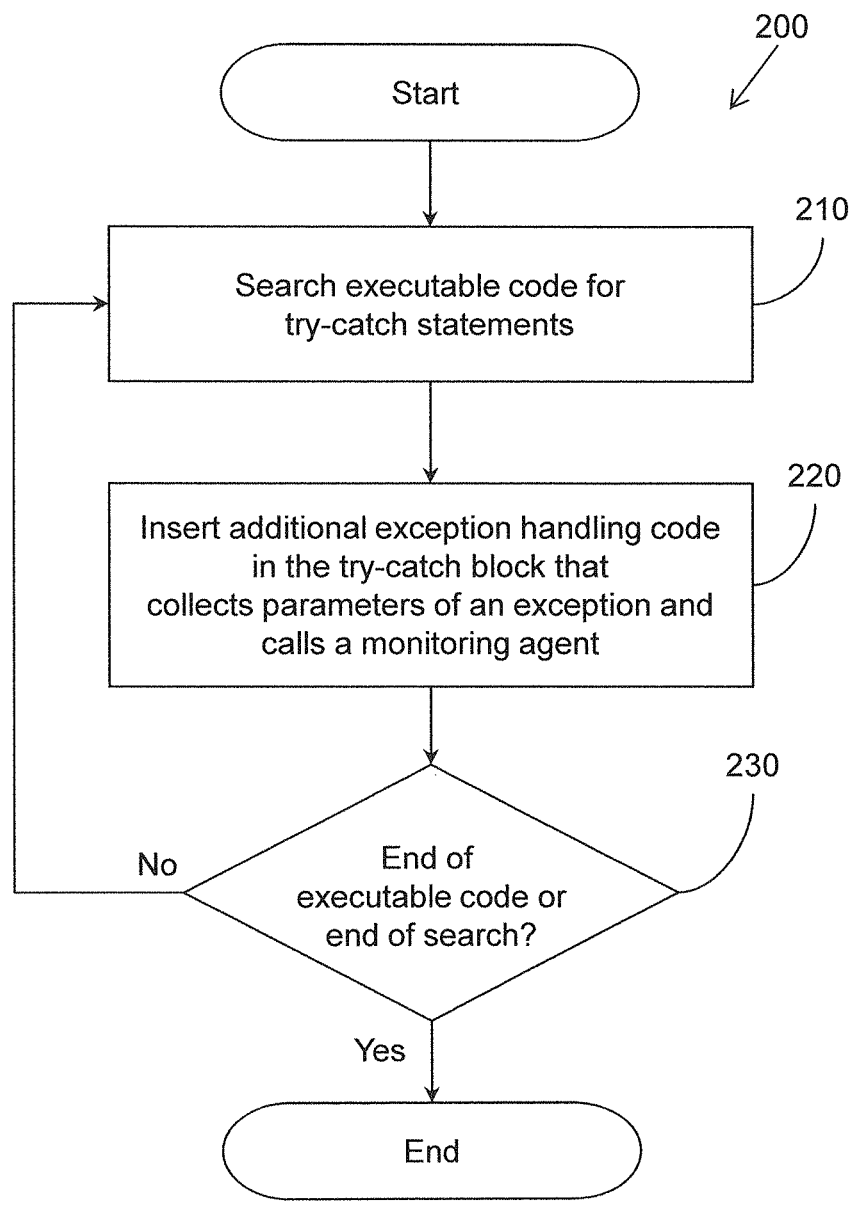
FIG. 2 illustrates another embodiment of a method associated with reconfiguring a Java application to customize exception handling code.

With reference to FIG. 2, another embodiment is shown of a method 200 associated with reconfiguring an application to customize exception handling code. Method 200 is discussed based on the application being a Java application.

In programming languages that support exception handlers, the code for exception handlers is labeled/identified with some type of marker statement that identifies the exception handling block. The method 200 can be configured to identify the particular marker statement. Several handler blocks can follow each other, and each block can specify which exception types it handles and what name it uses for the exception object. In some cases, the code may have nested exception blocks (e.g., one or more blocks that are within another block).

In Java, "try-catch" statements identify exception handling blocks. The "try-catch" statement is used to catch exceptions that might be thrown as a program executes. A programmer would write try-catch statements as part of the source code of the application so the program does not crash if the exception occurs.

For example, the "try-catch" statement (in source code syntax) has this general form:

```
try
{
    code that can throw an exception
}
catch (exception-type name)
{
    code executed when exception is thrown
}
```

The code/statements that might throw an exception are within the "try" block. The code in the "catch" block is executed when the particular type of exception occurs (e.g., "catch_type"). When the catch block completes execution, the processing continues after the catch block. Try-Catch blocks allow the application to continue executing after an exception is caught and the catch block finishes execution. Conversely, if the exception was never "caught," the exception would, in most cases, cause the application to fail in an ungraceful manner. In general, the fact that an exception occurred (even though it was caught) indicates (in most cases) that something went wrong with the processing. This could result in a negative impact on the application, despite the fact that the exception was caught.

Each catch block is an exception handler and handles the type of exception indicated by its argument. The argument type, Exception-Type, declares the type of exception that the handler can handle and is the name of a class that inherits from the "Throwable" class. The handler can refer to the exception with "name."

The catch block contains code that is executed if and when the exception handler is invoked. The Java runtime system invokes the exception handler when the handler is the first one in the call stack whose Exception-Type matches the type of the exception thrown. The system considers it a match if the thrown object can legally be assigned to the exception handler's argument.

With continued reference to FIG. 2, at 210, the method searches for try-catch statements in the executable code. As mentioned, the above example of a try-catch statement is shown in source code syntax whereas the compiled, executable version of the application would be in byte-code format. Thus method 200 is configured to identify the byte-code that represents the try-catch statements (how to search for and identify catch blocks is described in more detail below). Once identified and located, at 220, additional code is inserted in the identified try-catch block as previously described under FIG. 1, block 120. In this case, a call to the monitoring agent is inserted as part of the catch block code. At 230, the method repeats for the next identified catch block or ends if the search is complete. In another embodiment, source code may be searched for catch blocks, modified with the inserted code, and recompiled.

In one embodiment, a pseudo code representation of the code insertion may be as follows:

```
catch (exception-type name)
{
    Inserted code to call monitoring agent (information passed)
    Original code executed when exception is thrown
}
```

As previously discussed, the new code is inserted in the executable application and is in executable form itself (e.g., byte-code, machine code). Thus, when the application is executing and the catch block is triggered by the occurrence of the exception it is programmed to handle, the inserted code is executed (which calls the monitoring agent) and the original code of the catch block is executed (if any) afterwards. After the call is made to the monitoring agent, execution flow returns to the catch block and continues processing the next instructions. In another embodiment, the inserted code may be inserted in other portions of a try-catch block such that the order of processing may be different than shown above.

By inserting new code, which calls the monitoring agent, the application is reconfigured to force each modified catch block to pass diagnostic data about the exception (such as the exception object) to the monitoring agent as directed by the inserted code. As such, the executable application is reconfigured to provide diagnostic data for every exception that occurs during application execution even when the application did not originally provide such data.

The diagnostic data is valuable since it provides customers/users easy and instant visibility into the root cause of a failed business transaction when the failure manifests itself in the form of a Java exception. Without the present feature, Java exceptions that cause business transactions to fail can be notoriously hard to track down due to poor error-handling code or other design choices or constraints. For example, Java exceptions may be completely swallowed (e.g. empty catch block), or the root cause exception suppressed (e.g. new exception is thrown in a catch block, suppressing the original exception), or conditionally (based on log configuration) and partially logged to a proprietary or hard to find/use log file. By reconfiguring each catch block in an application as described herein, these situations are reduced or eliminated. Every catch block would respond to its caught exception by including a uniformed response (calling the monitoring agent) regardless of what its original code does.

In another embodiment, the monitoring agent is configured to associate a caught exception with its corresponding business transaction that the exception was a part of. Exception reporting (e.g., calling the monitoring agent) is useful in general. However, exception reporting becomes especially valuable when the system is able to associate the exception with the higher level application constructs (business transactions, etc). Without the association, a user cannot identify which business transaction caused the exception, or conversely, which exceptions happened as part of a given business transaction. A more detailed description of the associating feature is provided with reference to FIG. 3.

In one embodiment, the monitoring agent is an application configured to monitor other executing applications. For example, the monitoring agent may be a business transaction management (BTM) component. BTM is the practice of managing information technology (IT) from a business transaction perspective. It provides a tool for tracking the flow of transactions across IT infrastructure, in addition to detection, alerting, and correction of unexpected changes in business or technical conditions. BTM provides visibility into the flow of transactions across infrastructure tiers, including a dynamic mapping of the application topology. In another embodiment, the monitoring agent is any utility that collects and reports data from exceptions. The monitoring agent is a separate piece of code from the executable application but it typically runs under the same process as the application being monitored. In another embodiment, the monitoring agent may simply be a log file used to store the data collected from exceptions.

After the call is made to the monitoring agent, the caught exception is passed to the monitoring agent. In one embodiment, the agent chooses whether the exception should be reported based on filtering logic. The filtering logic, for example, may apply selected conditions to the exception data to determine an importance level. For example, it could report the exception if the catch block's execution happened in the context of a business transaction, or in the context of other important application information. The monitoring agent is configured to determine the application business transaction context, since its primary job is to monitor business transactions.

Therefore, upon receiving the exception, the monitoring agent can make this determination, based on the surrounding context that is stored (e.g. other application information it has intercepted on the same thread, etc). Reporting the exception may include one or more actions, for example, capturing the call stack and other exception information, reporting this information to a server-side BTM component along with the regular business transaction information, and then showing this correlated information to the user on a UI. It could also log the problem to a file, send an email describing the problem to an administrator, generate a message, and/or other desired actions. If the monitoring agent decides not to report the exception, then the runtime overhead for the particular execution is negligible since the above actions do not need to be performed.

Filtering Exceptions

In general, any complex application can have a large volume of exceptions even in a healthy environment where all transactions are completing successfully. In one embodiment, the present system/method is configured with filtering logic to address this by avoiding false positives (e.g., exceptions that do not terminate a transaction) through a combination of techniques for filtering exceptions (not limited to any order):

1. Injecting/instrumenting only relevant executable code (e.g., searching and injecting into a class that is loaded into memory). Other classes are not relevant until loaded for execution or are not relevant because they are Java runtime system classes.

2. Capturing and reporting exceptions that are within the context of a business transaction. If an exception is determined to not be part of a business transaction (e.g., exception is part of a different thread), the exception is filtered out and not reported (e.g., exceptions that happened outside of the scope of a business transaction are ignored/discarded by the filter). Processing overhead is reduced by not reporting such exceptions.

3. Comparing exceptions in failed transactions against baseline healthy transactions, and applying domain knowledge to narrow or identify the root cause exception.

4. Other logic to ignore benign exceptions, adaptive based on feedback (e.g., data from previous exceptions).

In one embodiment, one of the above filtering techniques may be applied or more than one may be applied.

Associating Exceptions with a Business Transaction

Figure 3:
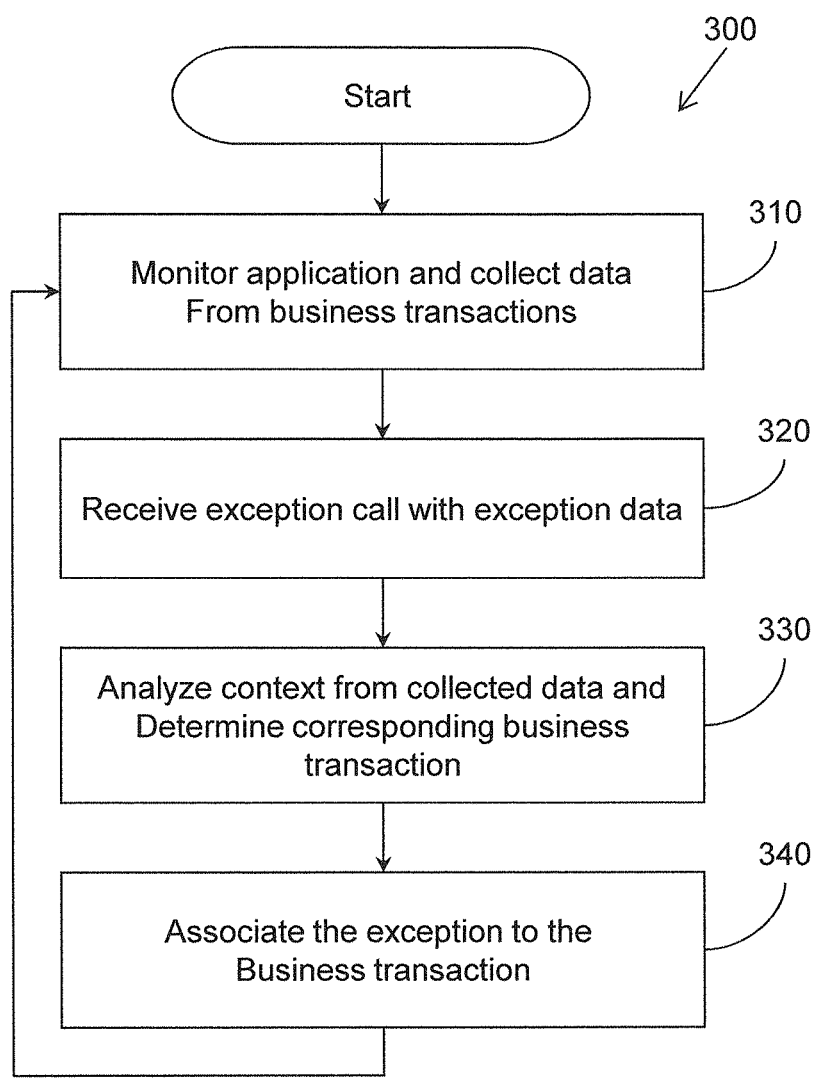
FIG. 3 illustrates an embodiment of a method for associating an exception with a business transaction.

With reference to FIG. 3, one embodiment is shown of a method 300 that associates a collected exception with a business transaction that the exception was part of (or occurred in). Method 300 is discussed from the perspective of the monitoring agent and is performed by the monitoring agent. The actions of method 300 are performed subsequent to the actions of FIG. 1, which modify a monitored application to call the monitoring agent.

As previously explained, the monitoring agent is configured to monitor and collect data about business transactions from a monitored application (block 310). During runtime, there may be thousands of business transactions occurring simultaneously from the application being monitored. At 320, when the monitoring agent receives an exception call containing exception information, the agent analyzes the surrounding context (e.g. thread) from the collected data to determine which business transaction to associate the exception with (block 330). At 340, the exception and the corresponding business transaction are associated together, for example, by linking them together, identifying associated pairs in a table or file, or other manner using a data structure to represent corresponding/associated objects.

Recall that the exception call is the call made to the monitoring agent from an exception handling clause (e.g., a call from a catch block). The call is part of the additional code that was inserted into the monitored application as described in FIG. 1. Configuring the monitoring agent to correlate exception information with the collected data from business transactions allows the exception to be associated with its corresponding business transaction. This allows a user to more easily track down and determine the exceptions thrown in the context of a business transaction (which could have likely caused the transaction to fail). It can also allow the user to see the vice-versa of this relationship; i.e. to go from a caught exception (or in an aggregated view where many exceptions are aggregated in one, e.g. based on their type, to go from a type of exception), to the business transactions in which such exceptions occurred. Such associations or linking were not possible with prior exception handling techniques that only reported exceptions without associating them to the higher-level application artifacts.

In one embodiment, linking captured exceptions with business transactions may be performed as follows. Consider two "types" of data: type (a) business transaction context and type (b) exceptions:

Data type a) Business Transaction Context. The monitoring agent collects local data about the business transaction (e.g. Username, Order#, etc.). Typically, the monitoring agent collects such data by monitoring interesting code that relates to such processing within the monitored application. The monitoring may occur using bytecode instrumentation (which embeds, into the application, calls to the agent that pass data during execution of the application) or other means for collecting execution data from the application. The business transaction management BTM server-side also has broader global (vs. local) business transaction context that is assembled by stitching together the local contexts the BTM receives from the monitoring agents (e.g., there could be multiple monitoring agents running). The BTM server-side may also have access to additional metadata context (that it has extracted from other sources or the user may have provided), such as the name of the business transaction etc.

Data type b) Exceptions. The monitoring agent collects information about caught exceptions as described above (note: even within the same monitored application, this could be the same monitoring agent that collects Data (a) or a different agent; in this embodiment it is the same agent).

In one embodiment, the monitoring agent stores information on a thread of execution whenever the agent gets called for data of type (a). For example, data collected from different threads are organized and stored in a distinguishable manner from each thread. Then when/if the agent gets called about data of type (b)—i.e. data about exceptions—the monitoring agent looks up the stored information on the thread of execution that corresponds to the same thread that generated the exception. That way the agent can associate the business transaction context information that has been stored for a thread with the exceptions that happened in its context.

In another embodiment, a thread ID (or other unique identifier ID) or correlation algorithm could be used to do the above correlation out of band. Furthermore, different correlation approaches could be used. For example, even if data (a) and data (b) are on different threads, the agent may be configured to decide to 'link' them together if the agent deems that the exception is related to the business transaction in any way (e.g., based on one or more predetermined conditions or thresholds for association).

As an example, consider an HTTP Servlet that executes on Java thread X. Further consider that the monitoring agent is able to intercept Servlet executions using bytecode instrumentation that passes execution data (business transaction data) to the agent via embedded call statements. Thus, when the Servlet gets hit, the agent gets called. When the agent gets called, the agent receives and stores selected business transaction data from the Servlet (e.g. the Servlet URL, customer ID, other information about the Servlet, etc. . . . ) on the running thread of execution (thread X). Java provides a 'thread local storage' mechanism that allows the agent to store the data collected from thread X, which is separated from other threads.

Then later, suppose an exception gets thrown as part of the same thread X. The exception's catch block is intercepted as described in this disclosure, and thus the monitoring agent gets called for that exception. At that point, the agent determines that the exception came from thread X (from the data passed) and the agent identifies and looks up the corresponding thread's local storage (which in this case was previously populated with transaction information about the Servlet executing on thread X). The agent associates this business transaction information about the Servlet from the local storage of thread X with the exception that was just reported from thread X.

The business transactions are assembled by stitching together all the calls of data type (a) that call each other either directly or indirectly (this call sequence can span multiple machines). The assembly of calls from data type (a) happens at the monitoring tool's server-side and the approach for doing that assembly is beyond the scope of this disclosure. However, in general, one approach for stitching is to intercept and inject a unique ID in each remote call in the transaction so that the unique ID makes it over to the other side (e.g., using Oracle Execution Context ID (ECID)). Then, this ID can be used to correlate the caller/callee. This can be performed for every 'hop' in the transaction thus building a full transaction flow. Other algorithms for stitching of transactions may be used that are known to one of ordinary skill in the art. Using any of these stitching algorithms, the system is able to correlate instances of transactions, and also capture rich Business Context at every hop. Combining the stitching with the ability to capture exceptions as disclosed herein, the system can correlate each exception with the rich Business Context, and provide a more comprehensive end-to-end view of the Business Transaction and its exceptions. Once the transaction is assembled, since every data type 'a' knows the exceptions that happened in its context (e.g., in the same thread as the transaction). These exceptions can then be presented to the user in the context of data 'a', or in the context of the overall transaction.

Note that other segmentations could be used, e.g. presenting the exceptions in the context of a monitored server since for each monitored server, the monitoring tool knows all the calls of type (a) that happened within that server, and consequently, the data type (b) exceptions attached to them. Thus the reconfigured application and the monitoring agent provide end-to-end monitoring and diagnostics for business transaction failures. Exceptions are captured, analyzed to identify the root cause exception, automatically correlated across multiple servers participating in a distributed business transaction, and reported within the context of the business transaction they occurred in.

Searching for Exception Handling Clauses

The following description provides an example for searching and identifying exception handling clauses in executable code, in one embodiment. For example, the description corresponds to actions that may be taken by the searching block 110 of FIG. 1 or the searching block 210 of FIG. 2.

In particular, the following description will be discussed based on Java and searching executable bytecode for catch blocks. Of course, as stated previously, other programming languages may be used and the present system/method may be configured to search for other types of exception handling clauses.

By way of background, in Java bytecode, each try-catch block is represented by an 'exception handler'. An exception handler specifies:

(1) A program counter (pc) of where the "try" block starts and ends (start_pc, end_pc).
(2) The type of exception that the exception handler is able to handle (catch_type)—e.g. java.lang.NullPointerException, etc.
(3) A program counter (pc) of where the "catch" block starts (handler_pc).

Each Java method has an array of these exception handlers, called an 'exception_table', since there could be many catch blocks within a method. A method in Java is a block of statements that has a name and can be executed by calling (also called invoking) the method from some other place in the program.

With knowledge of this configuration, in one embodiment, the monitoring agent is configured to locate try-catch blocks. When the monitoring agent analyzes a class file byte-code, while inside a method, the agent is configured to identify addresses associated with try-catch blocks. For example, when the agent encounters an address that is the start of a matching catch block (handler_pc) in the exception table, the agent determines that a catch block has been found and inserts the new exception handling code there (e.g., the code that calls the monitoring agent as described above).

In one embodiment, the monitoring agent is configured to perform instrumentation filtering to decide which catch blocks to modify and which catch blocks not to modify. If the agent decides not to modify a catch block, then the agent will not get called when that catch block gets invoked as a result of an exception.

Some examples of filtering conditions to determine which catch blocks to select and instrument may be as follows:

(a) Only modify catch blocks for classes loaded by certain classloaders (e.g. do not modify catch blocks loaded by core Java classloaders, since those are core Java classes that may not be interesting or relevant to business transactions).

(b) Only modify catch blocks within certain methods. As the agent inspects the methods of the class as described earlier, the agent is configured to only instrument catch blocks belonging to selected methods. The selected methods may be predetermined and specified in advance. Other methods may be designated to be ignored and thus not instrumented.

(c) Only modify catch blocks that match a certain exception type. For example, only modify catch blocks handling java.lang.NullPointerException (or ignore catch blocks handling that type of exception). The agent can look at the "catch_type" field (described earlier) and make this determination.

The following is an example expression that gives instructions to the agent on which catch blocks to instrument. These expressions are read by the agent (e.g. from a file) at the beginning, before any class gets inspected:

```
before:catch(+java.lang.Throwable) AND \
(NOT catch(+java.lang.ClassCastException)) AND \
(NOT within(com.oracle.samples.Foo bar(...)))
```

In the expression, "java.lang.Throwable" is the parent of all exceptions. "before:" tells the agent to inject the code at the beginning of the catch block (but an agent can inject code "after" if desired, i.e. at the end of the catch block). The above expression basically says: Instrument all catch blocks except those: (a) handling a specific type of exception (in the above example a ClassCastException or its subclasses); and (b) within the specified method (in the above example Foo.bar( ))—the scope could also be at the class, or package level. It will be appreciated that multiple catch/within expressions can be combined.

Capturing Exceptions Involving Database Procedure Calls and/or PL/SQL Blocks

In another embodiment, the systems and methods described herein may be configured to provide a mechanism to capture and report exceptions for database procedure calls made by an executing application that occur during business transactions. For example, rather than searching for exception handling clauses as previously described, the system and method is configured to search for code relating to database procedure calls within the executable code of an application.

Figure 4:
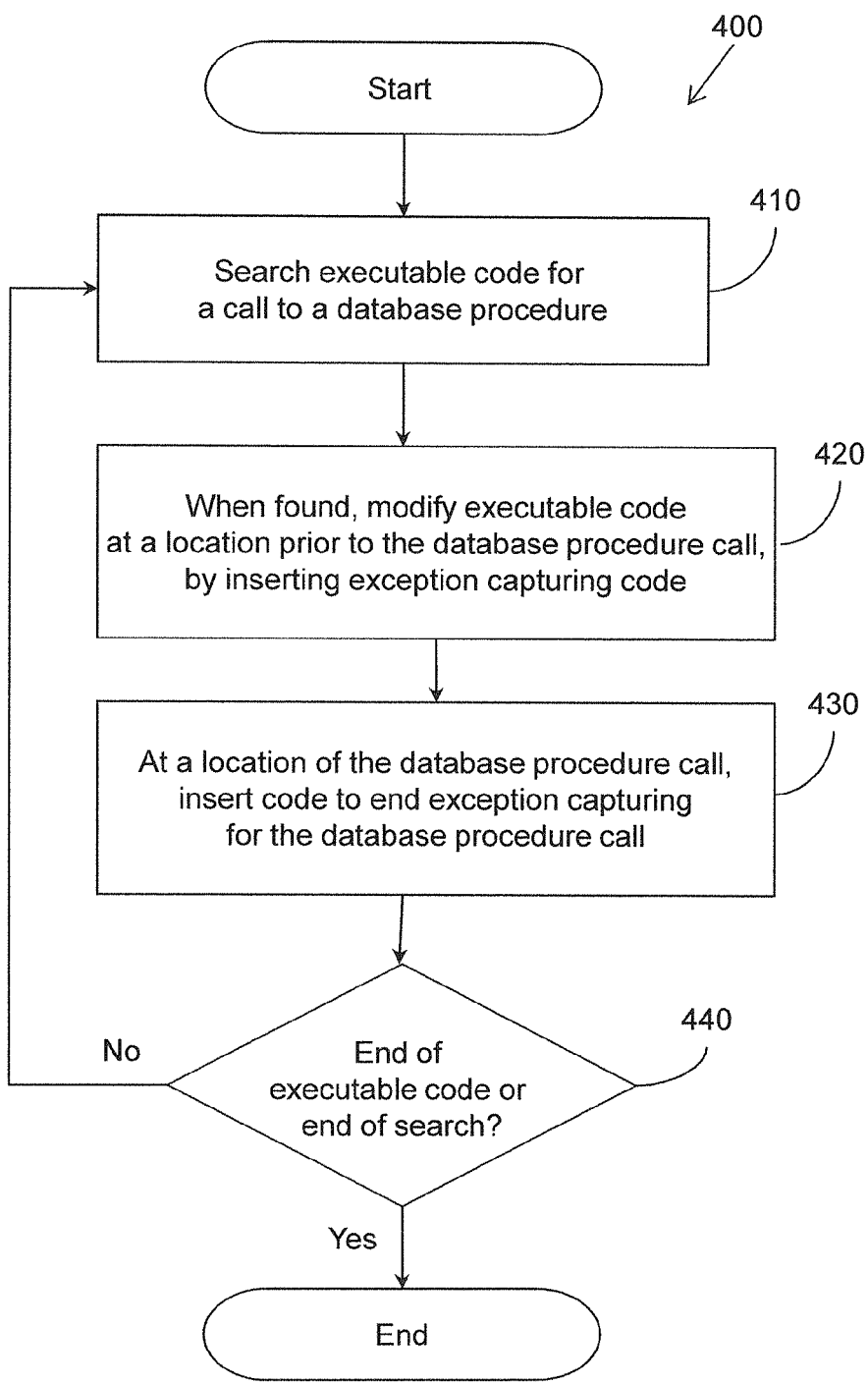
FIG. 4 illustrates an embodiment of a method for modifying executable involving database procedure calls.

With reference to FIG. 4, in one embodiment, a method 400 is shown that is associated with identifying a database procedure call within an executable code and modifying the executable code to cause exception information to be captured for the duration of the database procedure call. As previously explained, exception handling code programmed into an application may be poorly written or non-existent. This makes it very difficult or impossible to find the root cause of an exception. With method 400, capturing and reporting exceptions related to a database procedure call can be performed more consistently and reliably regardless of how the exception handling code was programmed into an application.

In one embodiment, the computer implemented method 400 programmatically analyzes and modifies an executable application to have pre-defined exception reporting techniques. For example, the method reconfigures/transforms the software application by modifying the code within the application by adding code for capturing exceptions for database procedure calls in a consistent and reliable manner.

Method 400 may initiate when an executable file is loaded into a memory for execution (e.g., Java class file loaded for execution). In one embodiment, the loaded file is in an executable form (e.g., bytecode, binary files, machine code, etc.) and maybe one file or a collection of files/modules. In one embodiment, the executable file is loaded for execution on one computing device and method 400 is performed by a remote device, or all of the functions may be performed on the same computing device.

At 410, the executable code is searched and analyzed for one or more database procedure calls that may appear within the executable code. Depending on the type of code or programming language of the source code, there is typically a defined syntax, a label, or instruction that is assigned to a database procedure call in the code. The computer implemented method 400 is configured to search for and identify the designated code that represents a database procedure call or code surrounding the database procedure call.

At 420, when a database procedure call is identified, the method injects exception capturing code into the executable code. The injecting operation transforms the executable code to have new code that performs an exception capturing function. In one embodiment, the exception capturing code is injected at a location prior to the database procedure call in the execution flow. In this manner, the exception capturing code will begin execution before the database procedure call is executed so that if any events occur during the execution of the database procedure call, information about those events will be captured and stored. In one embodiment, the injecting includes bytecode instrumentation that inserts new bytecode into the existing bytecode of the executable code.

In one embodiment, the database procedure call may be any statement that calls a database, retrieves data from a database, queries a database, or otherwise accesses a database. For example, a database procedure call may contain a PL/SQL block of code, or other programming language database procedure call or query (e.g. Transact-SQL, PostgresSQL, etc.). The following examples will be described in the context of a database procedure call that includes a PL/SQL block of code.

In one embodiment, the exception capturing code may include code that collects and stores execution information that occurs during the database procedure call (e.g., during execution of the corresponding PL/SQL block of code). In another embodiment, the exception capturing code may include a call to a remote program or function that is configured to capture exception data, or is a call to a monitoring agent such as a business transaction management (BTM) agent. The call to the remote program or monitoring agent causes the remote program to collect information relating to exceptions that occur during execution of the database procedure call As described previously, the BTM agent is a remote application that provides a tool for tracking the flow of transactions across IT infrastructure. In one embodiment, the exception capturing code may be a call to the agent where the call includes a parameter that tells the monitoring agent/remote program to initiate or enable capturing of exception data. The exception capturing code may be initiated prior to the execution of a target PL/SQL block of code.

At 430, termination code is inserted that is configured to terminate the collection of exception information, which was initiated by the exception capturing code. Inserting termination code transforms the executable code to have new code that performs a termination function. The termination code is inserted at a location in the executable code after or as part of the database procedure call (e.g., within or after the target PL/SQL block of code). In general, the termination code turns off or stops the collection of exception data. In one embodiment, the termination code may be a call to the monitoring agent/remote program where the call includes a parameter that tells the agent to stop or disable the capturing of exception data.

As another example, a database procedure call includes PL/SQL code, and the algorithm of method 400 identifies PL/SQL code and wraps exception capturing code with PL/SQL calls to enable and disable exception capture. During execution of the code when the database is called, the wrapped block of PL/SQL code is then sent to the remote database to execute. So, as part of the database procedure call, the database would receive and execute PL/SQL code that has a code structure like, for example:

---
Enable Exception Capture (e.g., the inserted exception capturing code)
Execute PL/SQL Code
Disable Exception Capture (e.g., the inserted termination code)

---

Consider the following execution flow example. In the executable code, when the PL/SQL block including the database procedure call is executed, a call is made to a remote database and the PL/SQL code is executed on the remote database. Here, the executing code is the calling application and the remote database is the callee.

When execution of the PL/SQL code on the database is complete, execution flow returns to the calling application. At this point, execution of the database procedure call is complete and thus exception capturing may be stopped. Then execution flow of the executing code is continued. In one embodiment, the termination code may be a call to the monitoring agent with a parameter that tells the agent to stop or otherwise disable capturing of exception data. In some embodiments, stopping or disabling the exception capturing may occur prior to or after execution flow returns from the database to the calling application.

In another embodiment, the executable code may be transformed with inserted code that causes separate remote database calls to enable and disable exception capture prior to and after a database procedure call rather than wrapping/inserting the enabling/disabling code as part of the PL/SQL code of database procedure call.

With continued reference to FIG. 4, at 440, the search for additional database procedure calls within the executable code may continue if there is more executable code to search. The method stops if the end of the executable code is reached or stops prior to the end if a command or setting indicates to stop searching.

Thus for distributed transactions as previously described, method 400 reconfigures an application to automatically capture and report exceptions that occur in heterogeneous business transactions including PL/SQL code. Since the executable code is modified, the source code does not need to be reprogrammed or compiled. Thus capturing PL/SQL exceptions provides visibility in the entire flow of a business transaction (end-to-end).

In one embodiment, a computing device is implemented with an executable algorithm that is configured to perform the method 400 or any other disclosed method herein. In one embodiment, method 400 is implemented as part of a monitoring agent application (e.g., the BTM agent) that monitors the execution of a target application and reconfigures the target application as described above.

Thus the monitoring agent along with the added code in the reconfigured application provide end-to-end monitoring and diagnostics for business transaction failures caused during PL/SQL code execution. Exception data is captured and automatically correlated across multiple servers participating in a distributed business transaction, and reported within the context of the business transaction they occurred in. In one embodiment, the exception data is correlated by using a unique identifier that is assigned to the database procedure call (or assigned to the PL/SQL call).

Figure 5:
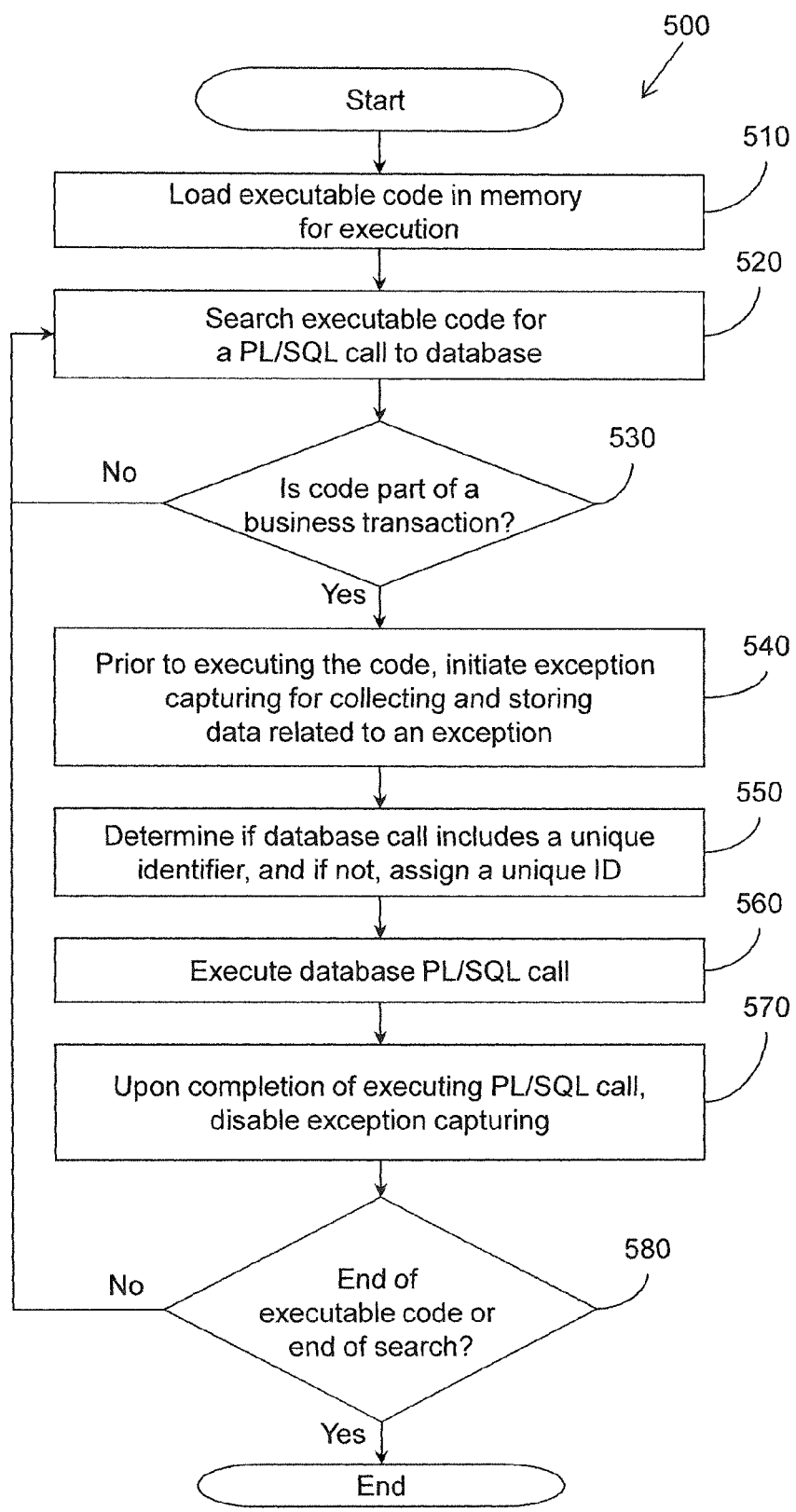
FIG. 5 illustrates another embodiment of a method for modifying executable involving database procedure calls.

With reference to FIG. 5, another embodiment of a computer-implemented method 500 is shown that is associated with modifying executable code to capture PL/SQL exceptions. Method 500 is configured to search for and/or modify only selected types of database procedure calls (e.g., those that are associated with a business transaction).

Method 500 is similar to method 400 but is configured so that selected instances of database procedure calls in the executable code are modified because not all PL/SQL exceptions are desired to be automatically captured. For example, PL/SQL exceptions that are in the context of business transactions are captured. The BTM Agent (monitoring agent) knows the business transaction context of executing calls by monitoring data related to threads as previously explained. During execution of transactions and using collected data, the BTM agent can identify that a "submit order" transaction is being processed and thus is a business transaction.

The monitoring agent uses this data to decide in real-time whether or not to add the exception capturing code for a PL/SQL block. In real-time means, for example, as an executable file (which includes PL/SQL calls) is being loaded into memory and prepared for execution.

Thus with reference to FIG. 5, at 510, executable code (a target application) is loaded into memory for execution. At 520, the executable code is searched for a call to a database procedure. This may include searching for and identifying code that corresponds to a database procedure call and/or a PL/SQL block of code that is part of the database procedure call.

In one embodiment, a database procedure call may be identified by code statements known to be associated with an application program interface (API) that is used to execute database procedure calls. For example, an interface called "CallableStatement" is one type of statement that can be searched for. The method may search the binary executable code for the database procedure "CallableStatement" API calls. It is noted that database procedures are sometimes referred to as "SQL stored procedures" or "database stored procedures."

At 530, when a call is found, the method determines whether the PL/SQL call to a database should have exception capturing enabled. If the PL/SQL database procedure call is not part of a business transaction (based on collected metadata from the transaction), then the method skips the code, returns to 520, and searches for the next database procedure call.

If at 530, the PL/SQL database procedure call is part of a business transaction (based on collected metadata from the transaction), then the method goes to 540 and modifies the database procedure call in the executable code to initiate exception capturing as explained in block 420 of FIG. 4. The exception capturing code is configured to collect and store data related to an exception if an exception occurs during the execution of the database procedure call, which includes the execution of the PL/SQL block of code.

At 550, the method determines if the database procedure call includes a unique identifier (that is assigned to the transaction). If there is not an identifier, then a unique identifier is generated and injected/assigned to the database procedure call. The unique identifier is then passed as a parameter as part of the database procedure call. Thus, the monitoring agent or other exception capturing code can correlate the database procedure call with any captured exception data by using the unique identifier. In one embodiment, the unique identifier is an Execution Context ID (ECID).

At 560, the PL/SQL code and data base call are executed. As previously explained, this involves calling a remote database and executing the PL/SQL code on the database. At 570, upon completion of executing the PL/SQL procedure, the inserted code disables exception capturing, and the flow returns to the calling program. Thus, exception capturing is turned off/stopped and remains that way until the next exception capturing code initiates it again. At 580, the method may continue for the next database procedure call or the method may end.

Thus with method 500, only certain types of database procedure calls may be selected for exception capturing. In one embodiment, PL/SQL code that is not part of a business transaction is not selected and is not modified with the exception capturing code.

With reference again to block 550, as previously explained, Oracle Execution Context ID (ECID) is one approach for injecting a unique ID in each remote call in a transaction. Once the unique ID is injected as part of a database procedure call, the unique ID passes to a callee device as a parameter in the database procedure call. Then, the ID can be used to correlate the caller and callee as well as any exception data that is collected during the database procedure call (during the PL/SQL call). The system stores the unique ID for each database procedure call and associates the unique ID with the collected exception data. This may be performed by using a data structure to store and correlate the ID and data to each other. Thus the exception data is correlated to the PL/SQL call so that an administrator can easily identify which PL/SQL call caused the exception.

Figure 6:
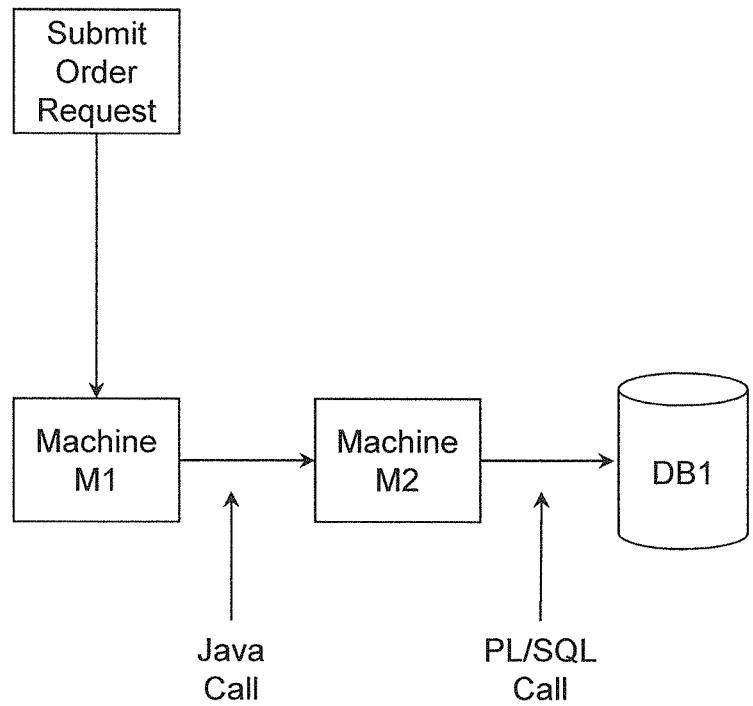
FIG. 6 illustrates an example flow diagram of calls being made to remote machines.

With reference to FIG. 6, the following is an example transaction.

Suppose a user is using a browser to access an online ordering application to buy some products. When the user wishes to complete the order, the user clicks or initiates a "submit order" or purchase request. When the request reaches a Data Center that handles the requests, it triggers a "Submit Order" business transaction that may traverse multiple servers in order to process the request. For example:

Request sent via network to Machine M1 (Java, Order System), which calls→Machine M2 (Java, Inventory System) to check inventory status of product, which calls→Database DB1 on which the PL/SQL Inventory code is executed. When the database procedure call completes processing (without errors), results are returned to the calling machine.

However, exceptions can occur anywhere along this simple flow. With the methods of FIG. 4 or 5, a monitoring agent can capture and report on any or all PL/SQL exceptions that may cause a transaction failure during the database procedure call to database DB1. Thus more complete visibility is provided into failed business transactions that are caused by database procedure calls and PL/SQL code.

PL/SQL Example

In general, PL/SQL is a block-structured language. The basic units (procedures, functions, and anonymous blocks) that make up a PL/SQL program are logical blocks, which can contain any number of nested sub-blocks. Typically, each logical block corresponds to a problem or subproblem to be solved.

The following is an example PL/SQL block of code that includes a database call (e.g., the SELECT statement):

```
DECLARE
   pe_ratio NUMBER(3,1);
BEGIN
   SELECT price / earnings INTO pe_ratio FROM stocks
      WHERE symbol = 'XYZ'; ← Note: might cause division-by-zero error
   INSERT INTO stats (symbol, ratio) VALUES ('XYZ', pe_ratio);
      COMMIT;
EXCEPTION
   WHEN OTHERS THEN
      NULL; ← Exception swallowed, with no indication that the code failed
END;
```

In this block, the exception handling clause designated by the statement "EXCEPTION" does not do anything to handle the exception since it is coded with "NULL." Here, the exception occurs if there is a division-by-zero error. Thus when the exception happens, the exception is swallowed and no indication or data is provided if the code fails. It is noted that the example code above is in source code format, not executable bytecode format.

The present system and methods of FIGS. 4 and 5 are configured to locate PL/SQL code and database procedure calls in the executable code as explained. Prior to the database procedure call (e.g., before the call is executed), the exception capturing code is inserted into the executable code. As previously explained, in one embodiment, the exception code is bytecode that is injected into the bytecode of the executable program. Then after the database procedure call, termination code is injected into the executable code to stop the capturing of exception data (e.g., inserted at the end of the PL/SQL code of the database procedure call). Thus the executable code is transformed into a new version of code by injecting/inserting new code.

Computing Device Embodiment

Figure 7:
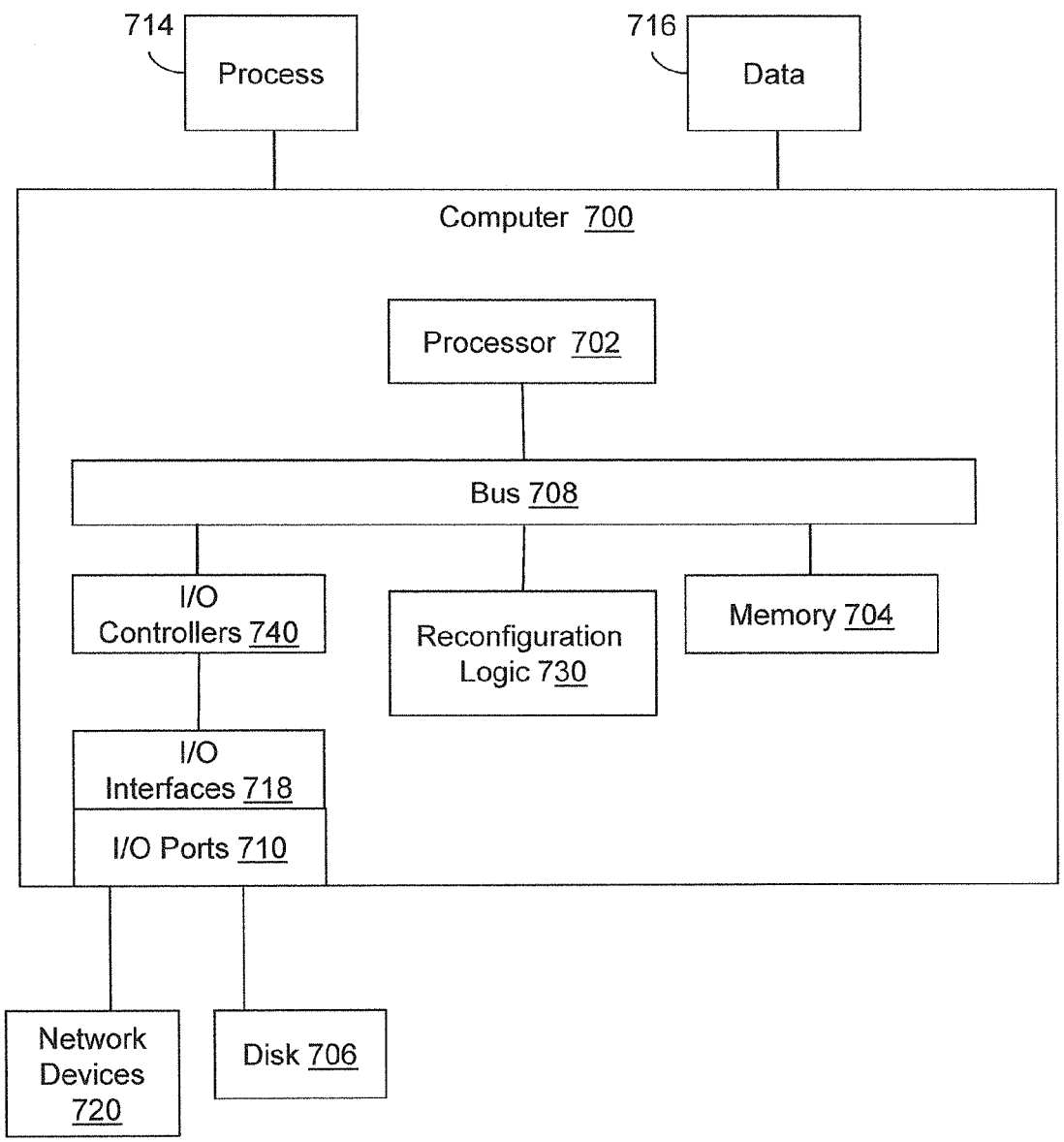
FIG. 7 illustrates an embodiment of a computing system configured to perform the methods of FIGS. 1, 2, 3, 4, and/or 5.

With reference to FIG. 7, one embodiment of a computing device 700 is illustrated that is configured and/or programmed with an algorithm/executable application to perform one or more of the example methods 100, 200, 300, 400, and/or 500 described herein, and/or equivalents. The example computing device may be a computer 700 that includes at least one processor 702, a memory 704, and input/output ports 710 operably connected by a bus 708. In one example, the computer 700 includes reconfiguration logic 730 configured to analyze executable code of an application and identify exception handling clauses as discussed previously. The reconfiguration logic 730 also modifies/transforms the executable code by reconfiguring the exception handling clauses (e.g., injecting code into a clause) to call a monitoring agent and pass data associated with an exception that occurs during execution of the executable code as discussed with reference to FIG. 1, 2, or 3.

In other embodiments, reconfiguration logic 730 is configured to perform one or more of the functions/actions as described under method 100, 200, and/or 300. In one embodiment, the reconfiguration logic 730 is part of a monitoring agent described above that monitors the execution of an application. Thus the monitoring agent may be configured to perform both the reconfiguration of code (as described above) and the monitoring of the same code, and thus configured to perform the function of associating/linking exceptions with business transaction data collected from an executing application.

In another embodiment, the reconfiguration logic 730 is configured to search for database procedure calls and modify/transform executable code for capturing exceptions for the database procedure call (and/or during a PL/SQL block of code) as well as perform other functions as described with reference to the algorithms of FIG. 4 or 5.

In different examples, the reconfiguration logic 730 may be implemented in hardware, a non-transitory computer-readable medium with stored instructions, firmware, and/or combinations thereof. The logic 730 may be a hardware component attached to the bus 708, may be implemented in the processor 702, or stored executable instructions in disk 706.

In one embodiment, the reconfiguration logic is configured to embed custom logic (e.g., selected executable code) into the executable code of a target software application so that re-programming of source code and re-compiling of the source code can be avoided. Modifying executable code requires no code change to the application source code or installed binaries on the file system. In one embodiment, byte-code instrumentation is used to dynamically modify the application's classes as they are being loaded into a Java Virtual Machine's (JVM's) memory at runtime. A static modification may be performed by statically modifying the binary .class files on disk prior to runtime and then replacing the binary files in the file system with new binary files that contain the modified catch blocks or the application is instructed to use the new modified files instead of the original files.

In one embodiment, logic 730 or the computer 700 is a means (e.g., hardware, non-transitory computer-readable medium, firmware) for analyzing and modifying an application as described.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with input/output devices via the I/O interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks. Other hardware and/or electrical components may also be implemented in the computer 700.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described and claimed herein are limited to statutory subject matter under 35 U.S.C §101.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, firmware, a non-transitory medium with stored instructions of an executable application or module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium with stored computer-executable instructions that when executed by a computer cause the computer to perform a method, the instructions comprising instructions configured for:

searching an executable code, using at least hardware of the computer, for code representing a database procedure call within the executable code;

at a location in the executable code prior to the database procedure call, inserting into the executable code an exception capturing code that is configured to cause information to be collected about an exception when the exception occurs during execution of the database procedure call; and inserting termination code after the database procedure call in the executable code, wherein the termination code is configured to terminate the collection of the information caused by the exception capturing code.

2. The non-transitory computer-readable medium of claim 1, wherein the instructions for inserting the exception capturing code include instructions that when executed by the computer cause the computer to transform the executable code to include an exception capturing function; and
wherein the exception capturing code is code that calls a remote program and causes the remote program to collect the information relating to the exception during execution of the database procedure call.

3. The non-transitory computer-readable medium of claim 1, further comprising instructions that when executed by the computer cause the computer to assign an identifier for the database procedure call, wherein the identifier is used to correlate the database procedure call with the collected business transaction information about the exception.

4. The non-transitory computer-readable medium of claim 1, wherein the computer-executable instructions that when executed by the computer cause the computer to search for the code representing the database procedure call by searching for a Procedural Language/Structured Query Language (PL/SQL) block of code, and wherein the instructions are configured to search for and identify the Procedural Language/Structured Query Language (PL/SQL) blocks in the executable code.

5. The non-transitory computer-readable medium of claim 4, wherein the instructions when executed by the computer cause the computer to search for and identify a selected type of the Procedural Language/Structured Query Language (PL/SQL) blocks in the executable code.

6. The non-transitory computer-readable medium of claim 1, further comprising instructions that when executed by the computer cause the computer to load the executable code into a memory for execution, wherein the loading is performed prior to the searching.

7. The non-transitory computer-readable medium of claim 1, wherein the exception capturing code is in an executable form and is inserted into the executable code.

8. The non-transitory computer-readable medium of claim 1, wherein the instructions that when executed by the computer cause the computer to search is performed by the computer, which is a first computing device, and the searching is performed on the executable code that is loaded on a second computing device remote from the first computing device.

9. The non-transitory computer-readable medium of claim 1, further comprising instructions that when executed by the computer cause the computer to insert the exception capturing code into the executable code by bytecode instrumentation.

10. A computer-implemented method, comprising:
loading executable code in a memory for execution;
searching the executable code in the memory for code representing a database procedure call;
prior to executing the database procedure call that is found, initiating exception capturing for collecting and storing data related to an exception that occurs during the execution of the database procedure call; and
upon completion of executing the database procedure call, disabling the exception capturing to cease collecting of the data related to the exception.

11. The method of claim 10, wherein the database procedure call is a Procedural Language/Structured Query Language (PL/SQL) call, and wherein the searching includes searching for one or more Procedural Language/Structured Query Language (PL/SQL) blocks of code in the executable code.

12. The method of claim 10, wherein initiating exception capturing includes inserting exception capturing code into the executable code that is configured to cause the data to be collected relating to the exception when the exception occurs during execution of the database procedure call; and
wherein the exception capturing code is inserted at a location prior to the database procedure call in the executable code.

13. The method of claim 10, wherein disabling the exception capturing includes inserting termination code after or as part of the database procedure call in the executable code, wherein the termination code is configured to terminate the collection of the data.

14. The method of claim 10, further comprising assigning an identifier for the database procedure call, wherein the identifier is associated with the collected data to correlate the database procedure call with the collected data relating to the exception.

15. The method of claim 10, wherein the searching includes searching for a plurality of database procedure calls in the executable code;
for a database procedure call that is found in the executable code, determining if the database procedure call is associated with a business transaction that is being executed; and
if the database procedure call is associated with a business transaction, then inserting exception capturing code in the executable code for initiating the exception capturing; otherwise the method further comprises searching for the next database procedure call and repeating.

16. A computing system comprising:
a processor configured to at least execute instructions;
a memory operatively connected to the processor;
reconfiguration logic, implemented with at least hardware of the computing system, configured to:
search executable code for code representing a database procedure call; and
at a location in the executable code where the database procedure call is found, insert into the executable code an exception capturing code that is configured to cause data to be collected about an exception when the exception occurs during execution of the database procedure call; and
transforming the executable code by inserting termination code as part of the database procedure call in the executable code, wherein the termination code is configured to terminate the collection of the data caused by the exception capturing code.

17. The computing system of claim 16, wherein the database procedure call is a Procedural Language/Structured Query Language (PL/SQL) call, and wherein the reconfiguration logic is configured to search for one or more Procedural Language/Structured Query Language (PL/SQL) blocks of code in the executable code that are included in a database procedure call.

18. The computing system of claim 16, wherein the exception capturing code includes code for initiating exception capturing and is configured to cause the data to be collected relating to the exception when the exception occurs during execution of the database procedure call; and
wherein reconfiguration logic is configured to insert the exception capturing code at the location which is prior to the database procedure call in the executable code.

19. The computing system of claim 16, wherein the termination code includes a call to a remote program, wherein the call includes a parameter that tells the remote program to stop capturing the exception data.

20. The computing system of claim 16, wherein the reconfiguration logic is further configured to assign an identifier for the database procedure call, wherein the identifier is associated with the collected data to correlate the database procedure call with the collected data relating to the exception.

\* \* \* \* \*

UNITED STATES PATENT AND TRADEMARK OFFICE
CERTIFICATE OF CORRECTION

| | | |
|---|---|---|
| PATENT NO. | : 9,652,353 B2 | Page 1 of 1 |
| APPLICATION NO. | : 14/548980 | |
| DATED | : May 16, 2017 | |
| INVENTOR(S) | : Kapur | |

It is certified that error appears in the above-identified patent and that said Letters Patent is hereby corrected as shown below:

In the Specification

In Column 12, Lines 36-37, delete "PostgresSQL," and insert -- PostgreSQL, --, therefor.

In Column 12, Line 51, after "call" insert -- . --.

Signed and Sealed this
Thirty-first Day of October, 2017

Joseph Matal
*Performing the Functions and Duties of the
Under Secretary of Commerce for Intellectual Property and
Director of the United States Patent and Trademark Office*